(12) United States Patent
Kuntz

(10) Patent No.: US 10,487,428 B2
(45) Date of Patent: Nov. 26, 2019

(54) PARTIALLY FIXATED SEMI-FINISHED TEXTILE

(71) Applicant: Premium AEROTEC GmbH, Augsburg (DE)

(72) Inventor: Julian Kuntz, Augsburg (DE)

(73) Assignee: Premium AEROTEC GmbH, Augsburg (DE)

( * ) Notice: Subject to any disclaimer, the term of this patent is extended or adjusted under 35 U.S.C. 154(b) by 0 days.

(21) Appl. No.: 16/254,234

(22) Filed: Jan. 22, 2019

(65) Prior Publication Data

US 2019/0153642 A1    May 23, 2019

Related U.S. Application Data

(62) Division of application No. 13/283,830, filed on Oct. 28, 2011, now Pat. No. 10,221,511.

(51) Int. Cl.
| | |
|---|---|
| *D04H 3/04* | (2012.01) |
| *D04H 3/08* | (2006.01) |
| *B29C 70/20* | (2006.01) |

(52) U.S. Cl.
CPC .......... *D04H 3/04* (2013.01); *D04H 3/08* (2013.01); *B29C 70/20* (2013.01); *Y10T 156/17* (2015.01); *Y10T 428/249921* (2015.04)

(58) Field of Classification Search
None
See application file for complete search history.

(56) References Cited

U.S. PATENT DOCUMENTS

| | | | |
|---|---|---|---|
| 5,866,253 A | 2/1999 | Philipps et al. | |
| 2002/0123287 A1 | 9/2002 | Davies et al. | |
| 2006/0169396 A1 | 8/2006 | Joern | |
| 2008/0166517 A1 | 7/2008 | Horne | |
| 2009/0068428 A1 | 3/2009 | Shinoda et al. | |

FOREIGN PATENT DOCUMENTS

| | | |
|---|---|---|
| DE | 2104550 A1 | 8/1972 |
| DE | 101 56 875 A1 | 5/2003 |
| DE | 102 50 826 A1 | 5/2004 |
| DE | 10 2007 032 904 B3 | 11/2008 |
| DE | 10 2009 044 833 A1 | 6/2011 |
| EP | 1 145 841 A1 | 10/2001 |
| EP | 1 584 462 A2 | 10/2005 |
| WO | WO 2007/099825 A1 | 9/2007 |
| WO | WO 2008/148791 A1 | 12/2008 |

OTHER PUBLICATIONS

European Search Report with partial English translation dated Feb. 17, 2012.
Machine translation of DE2104550, Fitzer, Aug. 10, 1972.

*Primary Examiner* — Shawn Mckinnon
(74) *Attorney, Agent, or Firm* — Crowell & Moring LLP

(57) ABSTRACT

A semi-finished textile for producing a fiber composite component part has a textile structure and a fixation structure so as to provide a semi-finished textile that can be easily handled and that is suitable for use in complex component part shapes. The textile structure includes a first multitude of reinforcement-fiber bundles of high-performance fibers. Displacement sections are formed between adjacent reinforcement-fiber bundles and adjacent reinforcement-fiber bundles can be displaced against each other. The fixation structure fixates the reinforcement-fiber bundles, depending on the textile structure, with a fixation pattern in such a way that the reinforcement-fiber bundles are fixated at least partially and the displacement sections remain at least partially free.

9 Claims, 4 Drawing Sheets

PARTIALLY FIXATED SEMI-FINISHED TEXTILE

CROSS-REFERENCE TO RELATED APPLICATIONS

This application is a divisional of U.S. application Ser. No. 13/283,830, filed on Oct. 28, 2011, which claims priority under 35 U.S.C. § 119 to German Patent Application No. 10 2010 050 079.8, filed Oct. 29, 2010, the entire disclosure of which is herein expressly incorporated by reference.

BACKGROUND AND SUMMARY OF THE INVENTION

Exemplary embodiments of the present invention relate to a semi-finished textile for producing a fiber composite component part, a device for producing a semi-finished textile for producing a fiber composite component part, and a method for producing a semi-finished textile and the use of a semi-finished textile.

Fiber composite component parts are used in aircraft, due to a favorable relationship between static properties and weight. However, fiber composite component parts are also gaining increasing interest in automotive engineering and other applications for these reasons. Fiber composite parts have high-performance fibers, for example, carbon or glass fibers, which are embedded in a matrix structure. In the production of a fiber composite component part, the high-performance fibers are provided in the form of semi-finished textiles and precut according to the component part geometry. The precut parts are placed into a mold, or also onto a mold, that already has, as a rule, the three-dimensional dimensions of the completed component part. The precut parts placed into the mold are described as preform. The term preform relates to joined, semi-finished dry fiber materials, whereby the semi-finished materials can have a binder to connect the reinforcement-fibers or high-performance fibers with each other for better handling, to be able to fixate the preform, or to modify the material properties. After insertion of the precut pieces, the matrix material is added into the mold, usually by suction, injection or force fitting, and a subsequent hardening, for example, by subjecting it to temperature and pressure. During hardening, a connection takes place between the high-performance fibers and the matrix material into a fiber composite material.

German Patent Document DE 10250826B4 discloses a method for the production of a three-dimensional preform consisting of textile starting materials that are deposited two-dimensionally in one layer and subsequently, the three-dimensional target shape of the preform is produced by shaping or draping of the two-dimensional fabric. It has been shown, however, that the handling of the precut parts of the semi-finished textile is difficult and thereby labor-intensive because of the instability of the textile. Moreover, inaccuracies can occur during placement in the assembly of the preform. As the result of the two-dimensional application of a binder on the semi-finished material, the precut can be handled easier, but such a semi-finished material is no longer suitable for use in complex component part shapes, as the binder limits the deformability.

Thus, there is a need to provide a semi-finished textile that can be handled easily and which is suitable for use in complex shapes of component parts.

This is achieved in accordance with exemplary embodiments of the present invention by a semi-finished textile, a device for the production of a semi-finished textile, as well as a method for producing a semi-finished textile, and the use of a semi-finished textile as cited in one of the independent claims.

According to an exemplary embodiment of the invention, a semi-finished textile for the production of a fiber composite is provided that has a textile structure and a fixation structure. The textile structure has a first multitude of reinforcement-fiber bundles comprising or consisting of high-performance fibers, whereby displacement sections are formed between two adjacent reinforcement-fiber bundles, and adjacent reinforcement-fiber bundles can be displaced against each other. The fixation structure fixates the reinforcement-fiber bundles—depending on the textile structure—with a fixation pattern in such a way, that the reinforcement-fiber bundles are at least partially fixated and the displacement sections remain at least partially free.

Reinforcement-fiber bundles include, for example, a number of individual carbon or glass fibers, which are assembled into a bundle.

According to an additional exemplary embodiment of the invention, the reinforcement-fiber bundles are connected with each other. The fixation structure has a binder, which fixates the reinforcement-fiber bundles with the fixation pattern at least partially.

According to a further aspect of the invention, the binder is a powder or a liquid.

According to a further aspect of the invention, the binder is applied in a coating pattern.

According to a further aspect of the invention, the coating pattern corresponds to the fixation pattern.

According to a further aspect of the invention, the reinforcement-fiber bundles are located parallel to each other.

According to a further aspect of the invention, the reinforcement-fiber bundles are woven together or are present in several, although parallel internally, in layers that are not parallel to each other.

According to a further aspect of the invention, the textile structure is located in a first layer, and the fixation structure in a layer that is adjacent to the first layer.

According to a further aspect of the invention, the fixation structure lies two-dimensionally against the textile structure.

According to a further aspect of the invention, the displacement sections are designed as displacement zones.

According to a further aspect of the invention, several layers of reinforcement-fiber bundles are provided, and the fixation takes place only at the outer layers.

According to a further aspect of the invention, several layers of reinforcement-fiber bundles are provided, and the fixation is provided at the outer layers as well as at one or more inner layers.

According to a further aspect of the invention, the fixation takes place by means of the fixation structure at the reinforcement-fiber bundles in the section of the center of the reinforcement-fiber bundles. The term "center" relates, for example, to the center of that lateral surface, at which the fixation structure lies against the respective reinforcement-fiber bundle.

According to a further aspect of the invention, the fixation structure has a connection structure, which connects the reinforcement-fiber bundles with each other.

According to a further aspect of the invention, the connection structure has a multitude of connection elements.

According to an exemplary embodiment of the invention, the connection structure includes a second multitude of connection elements that have a binder. The connection elements are connected by melting the binder with the reinforcement-fiber bundles.

According to a further aspect of the invention, the connection elements are conglutinated with the reinforcement-fiber bundles.

According to a further aspect of the invention, the fixation structure has a melting pattern in the form of the fixation pattern.

According to a further aspect of the invention, the connection elements are connected with the reinforcement-fiber bundles by a binder, whose compositing effect or adhesive effect is activated by the application of pressure.

For example, a binder that develops its adhesive or connecting effect by way of other types of exposures can also be used.

According to an exemplary embodiment of the invention, the fixation pattern is a line pattern or a dot pattern that is formed in relation to the textile structure.

In other words, a fixation pattern is provided that depends on the predetermined structure of the reinforcement-fiber bundles that are arranged into a textile structure. Thereby, the fixation pattern is independent of the precut shapes, i.e., formed independent of its subsequent use.

According to a further aspect of the invention, the textile structure is a woven fabric, in which the fiber bundles cross. For example, a dot pattern is provided as a fixation pattern.

According to an exemplary embodiment of the invention, the fixation pattern extends over the entire surface of the semi-finished material. Thus, the fixation pattern is not only provided for certain shapes on the semi-finished material, but independent thereof, and only in direct dependence of the textile structure.

According to an exemplary embodiment of the invention, the fixation structure has a multitude of meltable binder yarns.

According to a further aspect of the invention, the meltable binder yarns have binding material extending over their entire length, which is activated during the application of the fixation pattern only at those positions, however, at which a fixation is to take place.

According to a further exemplary embodiment of the invention, the fixation structure has a meltable fibrous web binder.

According to a further aspect of the invention, the meltable fibrous web binder has binding material extending over its entire (open) surface, which is activated during the application of the fixation pattern only at those positions, however, at which a fixation is to take place.

According to a further aspect of the invention, meltable binder yarns are combined with a meltable fibrous web binder.

According to a further exemplary embodiment of the invention, the fixation structure is a binder powder.

For example, a fixation structure can also exist independent of the binder, which is itself not partially melted, but is activated to connect by the binder.

The binder is, for example, only fixated in the sections of the fiber bundles at which no displacements occur, so that it affects the deformability in the least possible way.

For example, in the case of a fibrous web, the objective of holding the semi-finished material together can be primarily performed by something different, e.g., by a textile yarn that holds together a non-crimp fabric in the direction of through-thickness.

According to one aspect of the invention, the fibrous web binder is fixated on the textile structure so that it does not fall off, but just so, that this fibrous web binder does not impair the deformation. The textile would also hold together itself, even without the fibrous web binder, exactly because it also has a different fixation structure, or because in the case of a woven fabric, it consists of reinforcement-fibers that are woven together. In the case of a binder yarn it is actually often the case that it also holds the textile together, but it must not necessarily be so.

According to one aspect of the invention, the powder is first applied two-dimensionally, and then fixation takes place only at the positions of the corresponding pattern.

According to a further aspect of the invention, the un-fixated part of the powder then remains on the semi-finished material.

According to a further aspect of the invention, a removal of the un-fixated part takes place, for example, by suction, shaking off, or the powder simply falls off.

According to one aspect of the invention, the powder is applied precisely only in the provided pattern and fixated at those positions.

According to a further aspect of the invention, the binding material is applied, for example, in hot, molten form in the corresponding pattern. The binder can also be applied in a different form, for example, in liquid or at least viscous form, i.e., as viscous mass, which can be achieved, for example, by a solvent.

For example, the binder is thereby applied according to a pattern, which is guided by the textile structure, so that the displacement sections remain free.

According to a further aspect of the invention, the semi-finished textile includes a binder component that is needed in a subsequent processing step for binding several layers of textiles.

The invention also relates to the use of a semi-finished textile according to one of the embodiments described above.

According to the invention, a device for producing a semi-finished textile for producing a fiber composite part is also provided with a system for feeding a semi-finished textile and a system for applying the fixation pattern. The semi-finished textile has a textile structure and a fixation structure, whereby the textile structure has a first multitude of reinforcement-fiber bundles consisting of high-performance fibers. Between adjacent reinforcement-fiber bundles, displacement sections are formed, so that the adjacent reinforcement-fiber bundles can be displaced against each other. Further, a system for applying a fixation pattern for fixating the reinforcement-fiber bundles is provided, whereby the fixation pattern is formed depending on the textile structure in order to fixate the reinforcement-fiber bundles in such a way that the reinforcement-fiber bundles are at least partially fixated and the displacement sections remain at least partially free.

According to a further aspect of the invention, the reinforcement-fiber bundles are located parallel to each other. For example, the textile structure consists of a layer with reinforcement-fibers that are located exclusively parallel.

According to a further aspect of the invention, the textile structure has several layers with different orientation. Within one layer, the fibers are respectively parallel, for example, but the respective layers are not parallel.

According to a further aspect of the invention, the reinforcement-fiber bundles are woven together or are present in several, although within the layer parallel, but in layers that are not parallel to each other.

The fixation pattern is for the connection of the fixation structure with the reinforcement-fiber bundles, whereby the fixation pattern is designed depending on the textile structure, in order to fixate the fixation structure at the reinforcement-fiber bundles in such a way that the displacement sections between adjacent reinforcement-fiber bundles are formed, so that adjacent reinforcement-fiber bundles can be displaced against each other.

According to an exemplary embodiment of the invention, the system for applying the fixation pattern has sections having different temperatures, whereby first sections are provided with higher temperatures that bring about a melting of a binder which is in the connection elements, and second sections with lower temperatures that prevent a melting of the binder or preclude it.

According to one aspect of the invention, the system for applying the fixation pattern is a roller with some hotter and some cooler sections.

To apply the powder or binder mass only in a certain pattern, the roller can also be designed in such a way that it only takes on binder at hot positions and applies such to the textile only at these positions.

The roller can also be completely hot and the binding material discharges from the roller only at certain positions.

According to a further example, the roller is smooth and on a side facing away from the textile, binding material is applied to the roller according to the pattern, for example, applied by brush or dripped on, and the binding material is then applied onto the textile after rotating the roller.

According to a further aspect of the invention, the roller also applies pressure to the semi-finished textile. For example, as a result of the sections having different temperatures, different levels of pressure are also applied to the semi-finished textile.

According to a further aspect of the invention, the hotter and cooler sections form a linear pattern, whereby the line structure of the roller is located radially in the circumferential direction.

According to a further aspect of the invention, the line structure is arranged axially, i.e., perpendicular to the direction of rotation.

According to a further aspect of the invention, the line structure is designed at an angle to the direction of production, for example 30°, 45°, 60° or at a different angle.

According to a further aspect of the invention, the hotter and cooler sections form a dot-shaped pattern.

The invention also relates to the use of a semi-finished textile according to one of the embodiments described.

According to the invention, a method for producing a semi-finished textile for producing a fiber composite part is also provided, which includes the following steps:

a) Assembling a textile structure from a first multitude of reinforcement-fiber bundles consisting of high-performance fibers, whereby displacement sections are formed between adjacent reinforcement-fiber bundles and adjacent reinforcement-fiber bundles can be displaced against each other;

b) Placing a fixation structure on the textile structure; and c) Fixating the reinforcement-fiber bundles with the fixation structure by applying a fixation pattern depending on the textile structure, whereby the fixation structure fixates the reinforcement-fiber bundles in such a way that the reinforcement-fiber bundles are at least fixated partially and the displacement sections remain at least partially free and, for example, adjacent reinforcement-fiber bundles can be displaced against each other.

For example, the displacement sections between adjacent reinforcement-fiber bundles are left free or un-fixated. Adjacent reinforcement-fiber bundles can continue to be displaced against each other.

For example, the textile structure already has displacement zones, namely between adjacent fiber bundles. As a result of the fixation structure, the displacement sections are, for example, not created, but precisely in this section there is no fixation. The reinforcement-fiber bundles themselves are not displaced in the process, only the possibility of displacing them continues to exist. The displacement of the reinforcement-fiber bundles then takes place, for example, upon depositing on the component part geometry. If the semi-finished material were to be fixated two-dimensionally, i.e., without displacement sections, this possibility of displacement would no longer exist, i.e., there would also not be any deformability that is as free as possible.

According to one aspect of the invention, the term "placing" in step b) also relates to other methods in which the fixation structure is brought into contact with the textile structure as two-dimensionally as possible or is positioned in such a way in direct proximity to the textile structure that subsequently, the connection according to step c) can take place.

The previously described aspects for applying the fixation structure also relate to the application of a powder binder or a liquid binder, as has already been explained in detail above.

One aspect of the invention involves a semi-finished textile in which the individual reinforcement-fiber bundles, although they are connected with each other, and can thus be handled easier, however the fixation depending on the textile structure is designed in such a way that the semi-finished textile is still deformable. In a deformation of the semi-finished textile, displacements occur most often only at border positions between adjacent fiber bundles, which are also described as rovings. This is also the case when this roving structure is not even directly visible any longer. As it is provided according to the invention that these displacement positions are not fixated, the semi-finished material can be deformed. This is, for example, achieved thereby, that a binder lies only loosely above the displacement positions, or is not present at all.

One advantage of the invention is that when producing a fiber composite component part, the semi-finished textile can be cut into the required precut shape, and can subsequently be easily handled and directly placed into the preform. Thereby, the semi-finished textile according to the invention is also suitable for use in more complex component part shapes, as the semi-finished textile can also be adapted to those types of shapes because of the displacement sections that have been left free. Stabilization adapted to the respective precut part of a precut textile is not required.

In addition to the better manageability, according to a further aspect of the invention a binder is provided, that is used in the production of the preform, in order to, after a deformation process, for example, while being placed onto component part geometries, conglutinates several layers of textile with each other. For example, the binder is to be available prior to conglutination, but during deformation prior to conglutination, it is to disrupt as little as possible.

According to a further aspect of the invention, the binder yarns have binding material only at those position at which subsequently also a connection is to be established during the application of the fixation pattern.

It should be noted that the characteristics of the exemplary embodiments of the semi-finished textile of the device for producing the semi-finished textile also apply to the embodiment forms of the method and the use of a semi-finished textile and the reverse.

BRIEF SUMMARY OF THE DRAWING FIGURES

In the following, an exemplary embodiment of the invention is described in further detail with the aid of the enclosed drawings. Shown are:

DETAILED DESCRIPTION

Figure 1:
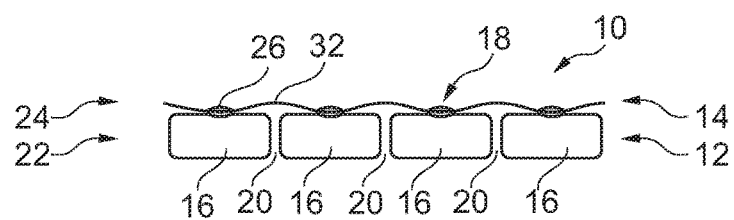
FIG. 1 shows a cross section through a semi-finished textile according to the invention.

FIG. 1 shows a semi-finished textile 10 for producing a fiber composite component part. The semi-finished textile has a textile structure 12 and a fixation structure 14.

As shown schematically in FIG. 1, textile structure 12 has a first multitude of reinforcement-fiber bundles 16 consisting of high-performance fibers. The high-performance fibers, for example, carbon fibers or glass fibers are shown schematically in a rectangular cross sectional form. It should be noted that reinforcement-fiber bundles 16 can also have a significantly flatter cross section and in particular, a cross sectional form that is different than a rectangle.

The reinforcement-fiber bundles are, for example, located essentially parallel to each other. For example, the location is at a regular distance or distance dimension.

According to a further aspect (not shown) the reinforcement-fiber bundles can also be woven together or lie in several internally parallel layers with different orientation on top of each other, for example, as non-crimp fabric.

Fixation structure 14 connects reinforcement-fiber bundles 16 with each other.

In the exemplary embodiment shown in FIG. 1, fixation structure 14 is fixated at reinforcement-fiber bundles 16 with a fixation pattern 18—depending on textile structure 12—in a way that it will be explained in more detail in FIG. 2. The fixation is provided in such a way that displacement sections 20 are formed between adjacent reinforcement-fiber bundles and adjacent reinforcement-fiber bundles 16 are displaceable against each other.

Figure 2:
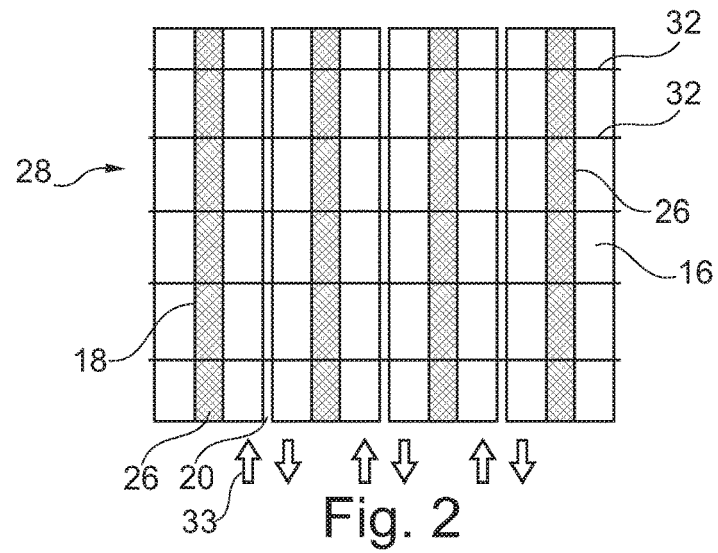
FIG. 2 shows a schematic top view of the semi-finished textile according to FIG. 1.
Figure 3:
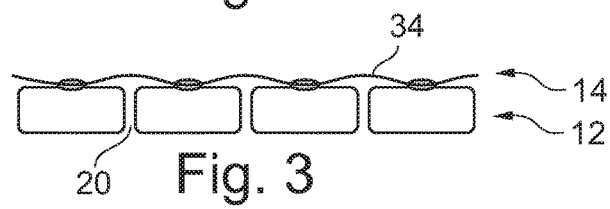
FIG. 3 shows a cross section through a further exemplary embodiment of a semi-finished textile according to the invention.
Figure 4:
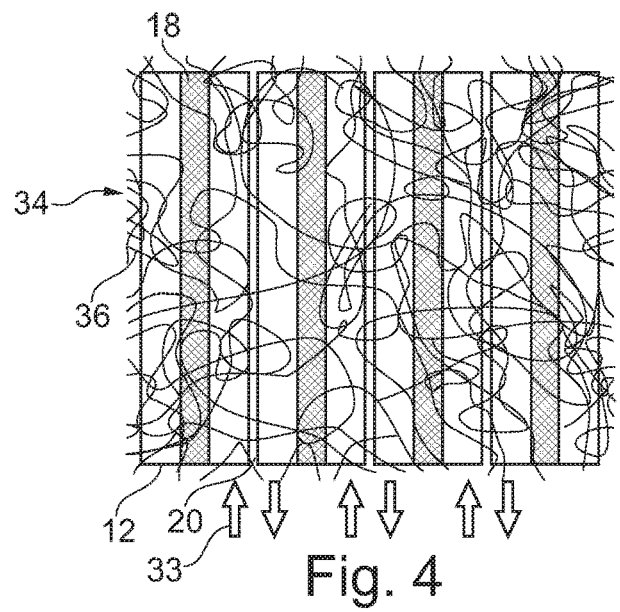
FIG. 4 shows a schematic top view of the semi-finished textile according to FIG. 3.

In FIG. 1 and also in FIGS. 2 to 4, displacement sections 20 are shown as free displacement zones. These displacement sections 20 can, however, also be arranged so that they are not directly visible, for example, then, when reinforcement-fiber bundles 16 lie directly against each other, whereby then, however, a displacement to each other is still possible.

According to a further aspect of the invention, textile structure 12 can be located in a first layer 22 and fixation structure 14 in a second layer 24 that is adjacent to first layer 22. For example, the fixation structure lies two-dimensionally at the textile structure.

In the exemplary embodiment shown in cross section in FIG. 1, fixation structure 14 is fixated at reinforcement-fiber bundles 16 approximately in the center—identified with reference number 26—of reinforcement-fiber bundle 16. As can be seen, the term "center" relates to the center of the lateral surface. Thereby, it is achieved that the reinforcement-fiber bundles can be displaced to each other as freely as possible, to ensure the deformability of semi-finished textile 10.

FIG. 2, which is a top view of semi-finished textile 10 from FIG. 1, illustrates that the connection between textile structure 12 and fixation structure 14 is provided in a line pattern 28. As can be seen, line pattern 28 is defined by textile structure 12 that lies underneath. Line pattern 28 is formed relative to textile structure 12.

According to a further exemplary embodiment, fixation pattern 18 is a dot pattern 30 that is likewise formed relative to textile structure 12.

According to a further aspect of the invention, the fixation structure has a number of connection elements 31.

According to the exemplary embodiment illustrated in FIGS. 1 and 2, fixation structure 14 has a multitude of meltable binder yarns 32 as connection elements 31. Binder yarns 32 are located perpendicular to the fiber direction of reinforcement-fiber bundles 16 in the exemplary embodiment shown. Because binder yarns 32 fixate reinforcement-fiber bundles 16 only in their central zone 26, reinforcement-fiber bundles 16 can be displaced against each other, as a result of which, good deformability of the semi-finished textile is provided. The displacement possibility is indicated by arrows 33.

In FIG. 2, the binder yarns are shown with a clear distance to each other. This results, strictly speaking, in a dot-shaped fixation pattern. If the binder yarns are located narrower, the points wonder to coincide with the lines, which are identified in FIG. 2 with reference number 26.

As, however, according to one aspect of the invention it can be provided that the fixation pattern is applied with rollers, a reaction takes place extending along the strips identified in FIG. 2 by reference number 26.

According to a aspect of the invention (not shown in further detail), the connection elements, for example, the binder yarns, can also run diagonal to the fiber direction of the reinforcement-fiber bundles.

According to the exemplary embodiment shown in FIG. 3 and FIG. 4, fixation structure 14 has a meltable fibrous web binder 35.

The top view of FIG. 4 schematically illustrates that the fibrous web binder 34 has a multitude of non-directional fiber elements 36 as connection elements 31. Fiber elements 36 of fibrous web binder 34 are connected with textile structure 12 by a linear fixation pattern that corresponds to fixation pattern 18 from FIG. 2. Even in this exemplary embodiment, deformability of semi-finished textile 10 with simultaneous simple handling is ensured, as a result of displacement sections 20.

Of course, a dot-shaped fixation pattern would also be possible when using a fibrous web binder, which is, however, not shown in further detail.

Figure 5:
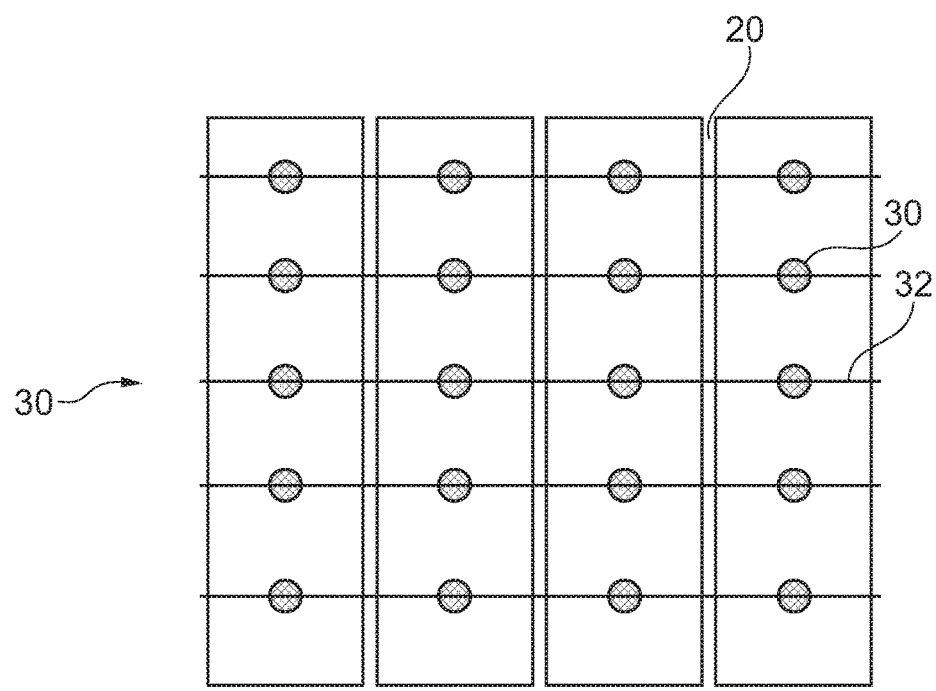
FIG. 5 shows a further exemplary embodiment of a fixation pattern according to the invention.

FIG. 5 is a schematic top view of a fixation pattern 18 designed as a dot pattern 30.

Figure 6:
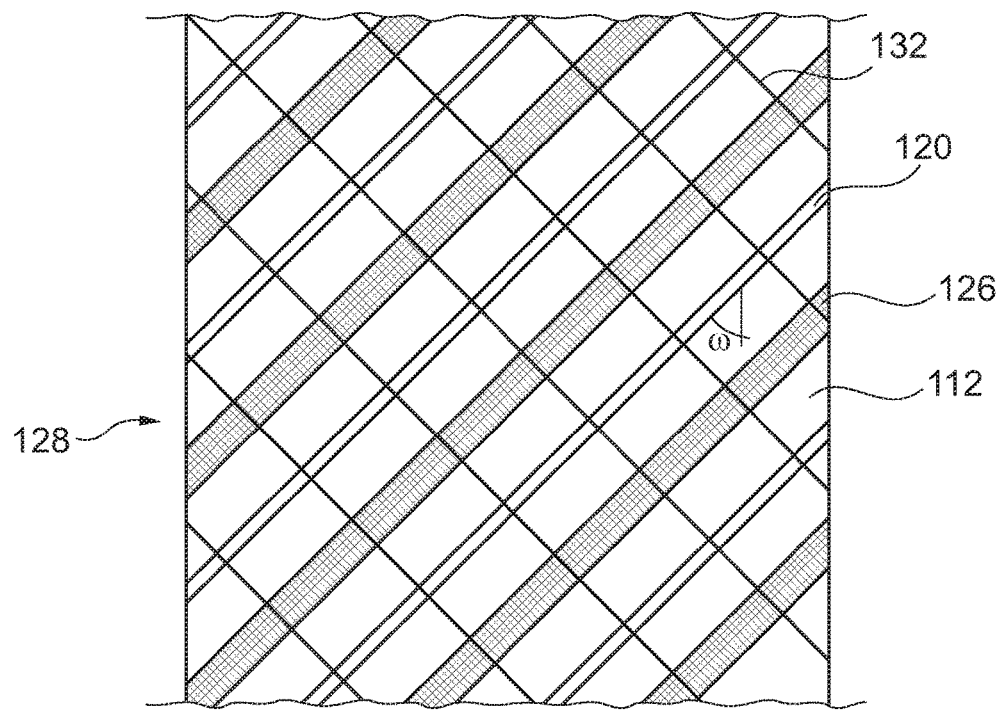
FIG. 6 shows a further exemplary embodiment of a fixation pattern according to the invention.

FIG. 6 shows a further exemplary embodiment for a line pattern 128 that is designed relative to textile structure 12. As schematically illustrated, textile structure 12 is located at an angle W to the direction of production, for example, having an angle W of 45°. To ensure the displaceability of reinforcement-fiber bundles 16, here also textile structure 112 has displacement sections 120. The connection is ensured and fixation structure 14 that is likewise located in angle W, connects the reinforcement-fiber bundles with each other in the central section 126, for example by using meltable binder yarns 132.

Figure 7:
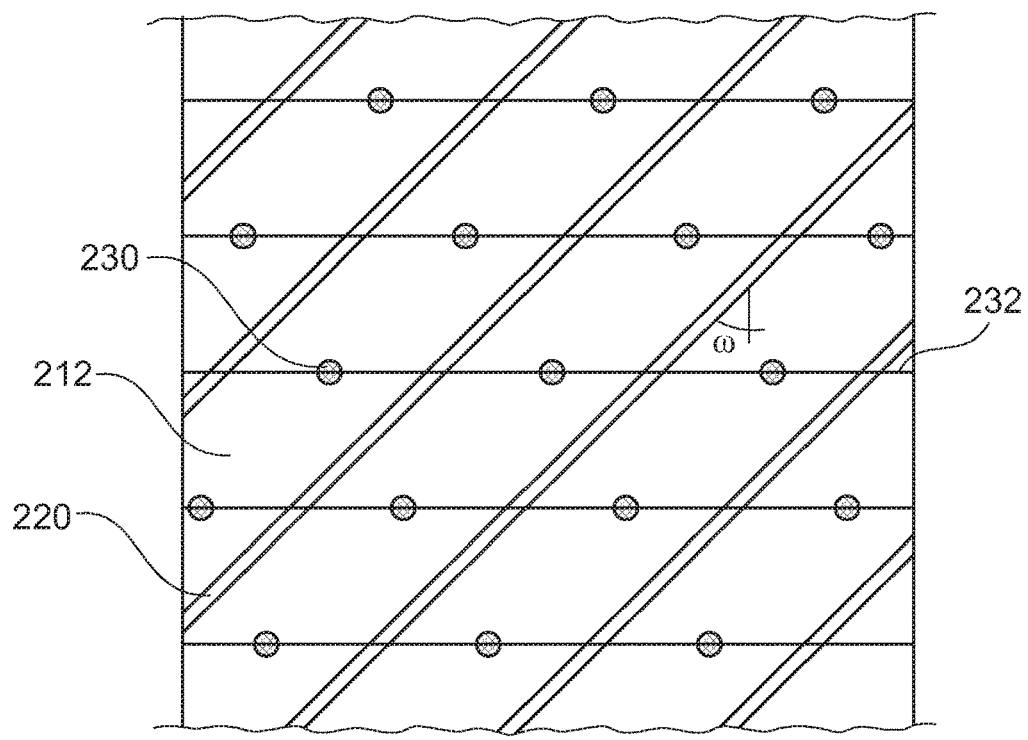
FIG. 7 shows a further exemplary embodiment of a fixation pattern according to the invention.

FIG. 7 illustrates a further dot pattern 230 that is likewise formed in relation to the textile structure. As can be seen, a textile structure 212 is provided that is formed at an angle W of approximately 30° to the direction of production. Accordingly, displacement sections 220 also have such an angle. The connection takes place, for example, by using binder yarns 232, which run perpendicular to the direction of production in the example shown, i.e., at an angle to displacement sections 220.

It should be noted that the exemplary embodiments shown in FIGS. 5 through 7 can be designed for additional fixation patterns in addition to the binder yarns shown, also with a meltable fibrous web binder.

According to an exemplary embodiment that is not shown, the fixation structure is an applied binder powder.

Figure 8:
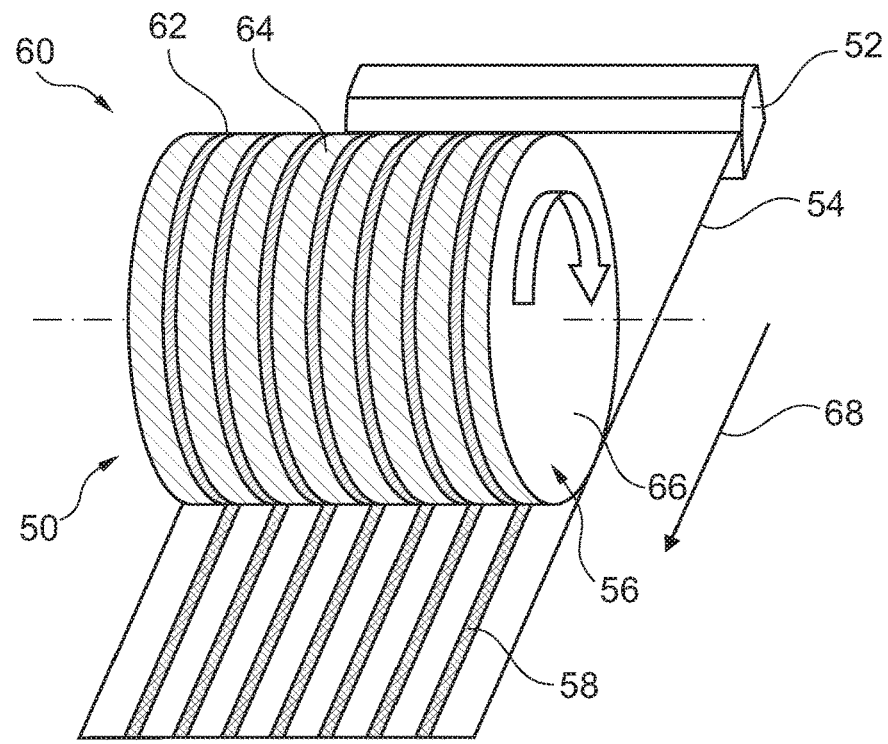
FIG. 8 shows a device for producing a semi-finished textile according to the invention.

FIG. 8 is a perspective illustration of a device 50 for producing a semi-finished textile for making a fiber composite component part. Device 50 shows a system 52 for feeding a semi-finished textile 54 having a textile structure and a fixation structure. Semi-finished textile 54 is designed as semi-finished textile according to one of the preceding exemplary embodiments. The textile structure has a first multitude of reinforcement-fiber bundles consisting of high-performance fibers that are located parallel to each other. Moreover, a system 56 is provided for applying a fixation pattern 58 for connecting the fixation structure with the reinforcement-fiber bundles. Fixation pattern 58 is formed depending on the textile structure, in order to fixate the fixation structure at the reinforcement-fiber bundles in such a way that displacement sections are formed between adjacent reinforcement-fiber bundles, so that adjacent reinforcement-fiber bundles are displaceable against each other.

According to one aspect of the invention, the system for applying the fixation pattern has sections 60 having different temperatures. Accordingly, first sections 62 are provided with higher temperatures, which effect a melting of a binder, which is in the connection elements. Moreover, two sections 64 are provided, which have lower temperatures, which prevent a melting of the binder.

For example, system 56 for applying fixation pattern 58 is a roller 66 with some hotter and some cooler sections.

In the exemplary embodiment shown in FIG. 8, the fixation pattern is a line pattern, and roller 66 has a linear pattern of hotter and cooler sections, which is located radially in the circumferential direction.

Because fixation pattern 54 is always formed relative to the textile structure, according to an additional exemplary embodiment (not shown) it is provided that in a textile structure 12—perpendicular to the direction of textile production, which is indicated by an arrow 68—i.e., when reinforcement-fiber bundles 16 run perpendicular to the direction of textile production 68, roller 66 has a line structure that is located axially on the circumferential surface, i.e., perpendicular to the direction of rotation.

According to a further exemplary embodiment of the invention (not shown) the roller has a dot pattern of hotter and cooler sections, i.e., the hotter sections are located distributed dot-shaped, in order to apply a dot-shaped fixation pattern.

According to a further aspect of the invention, instead of a roller, a device can also be used that has a multitude of smaller rollers, to provide a corresponding fixation pattern.

According to a further aspect of the invention, instead of rollers, different suitable devices for the application of a fixation pattern can also be provided; for example, dies with a dot-shaped impact that move along in sections with a continuously evenly moving semi-finished textile or, in the case of a textile that moves haltingly, i.e., in a progression of motion that is stopped briefly, when the semi-finished textile is passed through, a die that impacts stationary.

Figure 9:
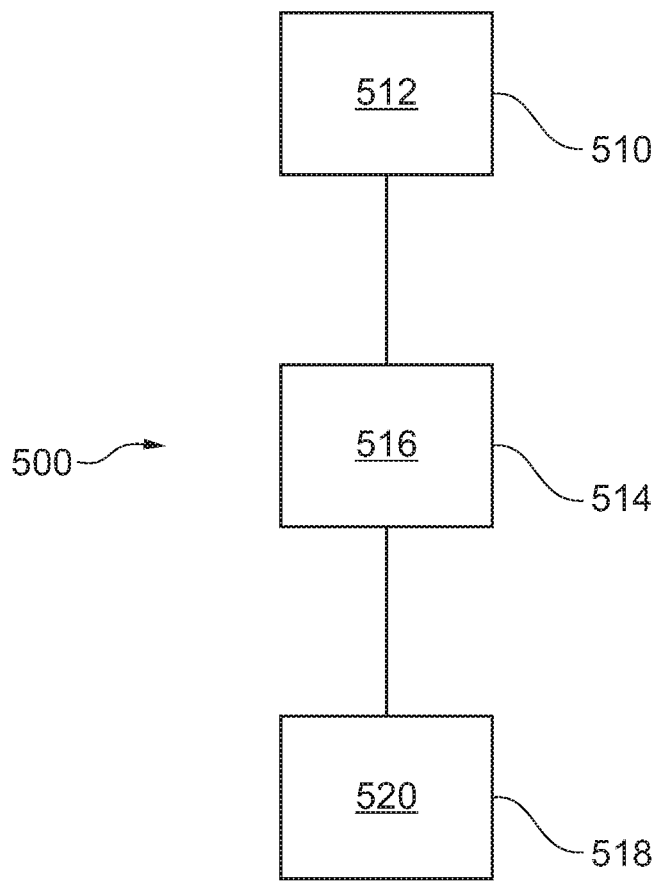
FIG. 9 shows the method steps of a method according to the invention for producing a semi-finished textile.

In FIG. 9, a method 500 for the production of a semi-finished textile for producing a fiber composite component part is shown. In a first assembly step 510, textile structure 512 is assembled from a first multitude of reinforcement-fiber bundles consisting of high-performance fibers, whereby the reinforcement-fiber bundles are, for example, located parallel to each other. Subsequently, a fixation structure 516 is placed onto the textile structure in second assembly step 514. After that, in a fixation step 518, the reinforcement-fiber bundles are fixated with the fixation structure by applying a fixation pattern 520 depending on the textile structure, whereby the fixation structure is fixated at the reinforcement-fiber bundles in such a way, that the reinforcement-fiber bundles are at least partially fixated, and the displacement sections remain at least partially free.

Assembly step 510 is also described as step a), placement step 514 as step b) and fixation step 518 as step c).

According to one aspect of the invention, a binder is fixated locally on the semi-finished textile, i.e., the textile structure in such a way that it least hinders possible displacement for deformation. According to the invention, this is provided primarily in the center of the reinforcement-fiber bundles. As has already been shown, the two sections between fiber bundles, at which displacements take place are not conglutinated, i.e., no binder is applied there, or a binder element that extends above it, for example, a binder yarn or a fibrous web binder, it is not connected at these positions, for example, by melting, in order to prevent a conglutination at these positions. The melt pattern or fixation pattern thereby orients itself not at the component part geometries or precut geometries, but at the semi-finished material structure and is, according to the invention, identical everywhere on the semi-finished material. Perhaps the outer edges of the web-like material and the beginning and end cut selvedges are designed differently for handling during storage and transport, for example, stiffer.

Consequently, stabilization is a feature of the semi-finished textile according to the invention and does not require to be applied at a later point in time, for example, in any form during the production process that is dedicated to a component part.

It should be noted that the definition that the fixation pattern must be formed in relation to the textile structure also covers those cases in which—due to imprecisions that occur in any production process—offsets or a non-agreement between the fixation pattern and the textile structure occur. For example, in a line pattern that is not very precisely coordinated, a successive offset can cause a deviation from the central position. After a certain number, the connection sections then become arranged in the intermediate area that is actually provided as displacement section and subsequently, as a consequence in turn to an approximation to the central position. Even in the case of imprecisions of this type, however, it is ensured that in the case of a multitude of adjacent zones between the reinforcement-fiber bundles a displacement section will be formed, so that the fundamental deformability is ensured, even if there is a fixation in one or another displacement section and there, a displacement is then actually no longer possible.

In addition it is to be pointed out that "including" does not preclude any other elements or steps and "one" or "a" does not preclude a multitude. Furthermore, let it be pointed out that characteristics or steps that have been described by referring to one of the above exemplary embodiments, can also be used in combination with other characteristics or steps of other exemplary embodiments described above. Reference numbers in the claims are not to be viewed as limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manufacturing a semi-finished textile for producing a fiber composite component part, the method comprising:
   assembling a textile structure from a first multitude of reinforcement-fiber bundles, wherein bundles displacement sections are formed between adjacent reinforcement-fiber bundles that are displaceable against each other;
   placing a fixation structure onto the textile structure;
   fixating the reinforcement-fiber bundles by means of the fixation structure by applying a fixation pattern so that the reinforcement-fiber bundles are at least partially fixated and the displacement sections remain at least partially free,
   wherein the fixation pattern includes predetermined fixation points on each of the reinforcement-fiber bundles,
   wherein the predetermined fixation points on each of the reinforcement-fiber bundles is a central zone of each of the reinforcement-fiber bundles,
   wherein the fixation structure includes a multitude of meltable binder yarns fixated to each of the reinforcement-fiber bundles only in the central zone of each of the reinforcement-fiber bundles, and
   wherein each meltable binder yarn of the multitude of meltable binder yarns includes a binding material.

2. The method as recited in claim 1, wherein the reinforcement-fiber bundles are connected with each other, and wherein the fixation structure has a binder that at least partially fixates the reinforcement-fiber bundles.

3. The method as recited in claim 1, wherein the fixation structure has a connection structure connecting the reinforcement-fiber bundles with each other, wherein the connection structure includes a second multitude of connection elements having a binder, and wherein the connection elements are connected with the reinforcement-fiber bundles by melting of the binder.

4. The method as recited in claim 1, wherein the fixation pattern is a line pattern or a dot pattern that is formed in relation to the textile structure.

5. The method as recited in claim 1, wherein the fixation pattern extends over an entire surface of the semi-finished textile.

6. The method as recited in claim 1, wherein the fibers of the reinforcement-fiber bundles are carbon fibers or glass fibers.

7. The method as recited in claim 1, wherein the first multitude of reinforcement-fiber bundles of fiber have a flat surface carrying the predetermined fixation points.

8. The method as recited in claim 1, wherein each meltable binder yarn of the multitude of meltable binder yarns includes the binding material extending over an entire length of each meltable binder yarn.

9. The method as recited in claim 1, wherein each meltable binder yarn of the multitude of meltable binder yarns includes the binding material only at positions on each meltable binder yarn overlaying the predetermined fixation points on each of the reinforcement-fiber bundles.

* * * * *